CYCLIC SWITCHING NETWORK FOR RADIO-FREQUENCY SIGNALS
Filed Feb. 6. 1969 4 Sheets-Sheet 1
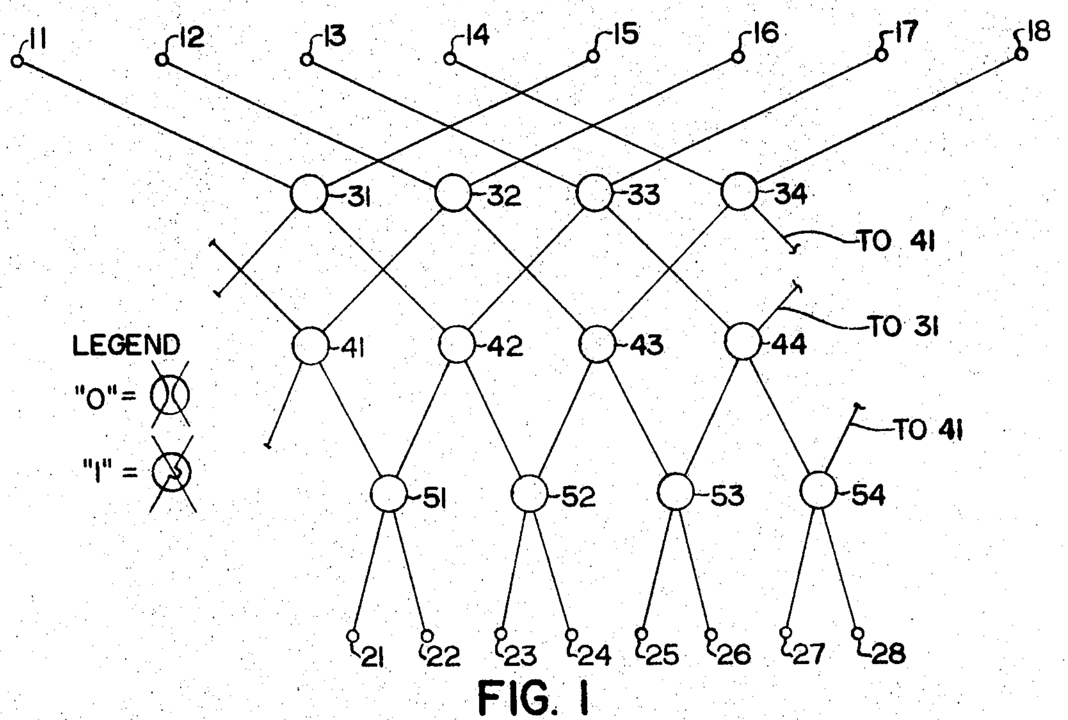
FIG. 1
| | | | |
|---|---|---|---|
| 1000 | 1100 | 1110 | 1111 |
| 0011 | 1001 | 1100 | 0110 |
| 1010 | 0101 | 1010 | 0101 |
| STATE 1 | STATE 2 | STATE 3 | STATE 4 |
| 0111 | 0011 | 0001 | 0000 |
| 0011 | 1001 | 1100 | 0110 |
| 1010 | 0101 | 1010 | 0101 |
| STATE 5 | STATE 6 | STATE 7 | STATE 0 |
FIG. 2
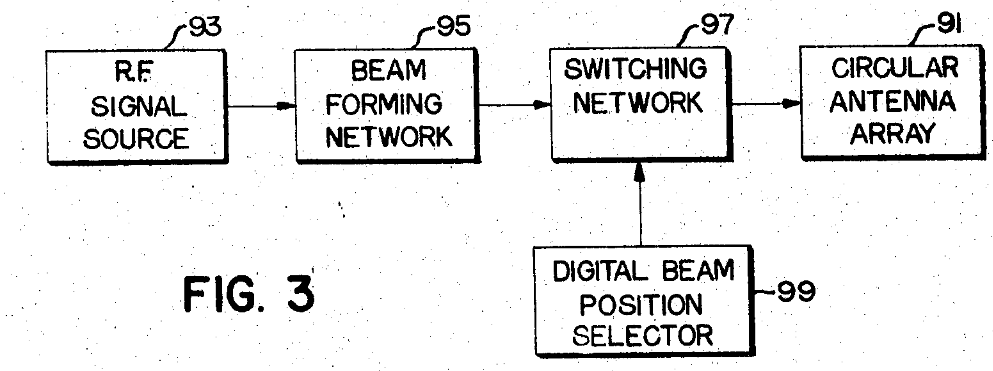
FIG. 3
INVENTOR.
JAMES W. GRAHAM
BY
Kenway, Jenney & Hildreth
ATTORNEYS

CYCLIC SWITCHING NETWORK FOR RADIO-FREQUENCY SIGNALS

| | |
|---|---|
| STATE 1 | 0 0 0 0 0 |
| STATE 2 | 0 0 0 0 1 |
| STATE 3 | 0 0 0 1 1 |
| STATE 4 | 0 0 1 1 1 |
| STATE 5 | 0 1 1 1 1 |

INVENTOR.
JAMES W. GRAHAM
BY
Kenway, Jenney & Hildreth
ATTORNEYS

| | | | |
|---|---|---|---|
| 0000 | 0100 | 0110 | 0111 |
| 0000 | 1010 | 1111 | 0101 |
| 0000 | 1111 | 0000 | 1111 |
| STATE 1 | STATE 2 | STATE 3 | STATE 4 |
| 1111 | 1011 | 1001 | 1000 |
| 0000 | 1010 | 1111 | 0101 |
| 0000 | 1111 | 0000 | 1111 |
| STATE 5 | STATE 6 | STATE 7 | STATE 0 |

INVENTOR.
JAMES W. GRAHAM
BY
Kenway, Jenney & Hildreth
ATTORNEYS

INVENTOR.
JAMES W. GRAHAM
BY
Kenway, Jenney & Hildreth
ATTORNEYS

United States Patent Office 3,537,035
Patented Oct. 27, 1970

3,537,035
CYCLIC SWITCHING NETWORK FOR RADIO-FREQUENCY SIGNALS

James W. Graham, Arlington, Mass., assignor to Adams-Russell Co., Inc., Waltham, Mass., a corporation of Massachusetts
Filed Feb. 6, 1969, Ser. No. 797,128
Int. Cl. H01p *1/10*
U.S. Cl. 333—7 7 Claims

ABSTRACT OF THE DISCLOSURE

A radio-frequency switching network is disclosed which permits any one of a plurality of inputs to be connected to any one of a corresponding plurality of outputs with the other inputs being connected to the other outputs in order.

The output signals as a group can be switched by the switching network to any output position without changing the order within the group. The network is made up of a multiplicity of two-state switching elements interconnected in a succession of levels with equal path lengths between levels such that each input signal passes through one switch in each level, with the path length being the same in either state of the switching element. Accordingly, the time delay or phase relationships between input signals applied to the various inputs are preserved at the outputs independent of the particular position of the output group.

BACKGROUND OF THE INVENTION

In order to provide directional antenna systems for various radar and communication purposes, the far fields of a plurality of antenna elements must be combined in such a way that they reinforce in a selected direction. In order to provide such summing, it is necessary that the relative time delay or phasing of the various signals applied to the different antenna elements be adjusted in very exact fashion. The direction in which a circularly symmetric antenna system is aimed may then be varied appropriately switching the signals applied to the different elements of the circular array. However, if a very large number of antenna elements are employed, the number of switching elements which may be required can become so large as to be impractical or uneconomical.

In one aspect of the present invention, the number and complexity of the switching elements required for a directional circular antenna array is reduced significantly by employing a novel switching network or matrix to obtain step changes in the direction in which a circular array antenna system is aimed.

Among the several objects of the present invention may be noted the provision of a switching network for radio-frequency signals which permits any one of a plurality of inputs to be connected to any one of a corresponding plurality of outputs; the provision of such a network in which the path length from any input to a selected output is constant; the provision of such a network which conserves radio-frequency power applied thereto; the provision of such a network which preserves impedance matching at all inputs and outputs; the provision of such a network can be operated over a wide range of frequencies; the provision of such a network which employs relatively simple switching elements; the provision of such a network which employs a minimum number of such switching elements; and the provision of such a network which is relatively simple, inexpensive and reliable. Other objects and features will be in part apparent and in part pointed out hereinafter.

SUMMARY OF THE INVENTION

Briefly, a switching network according to the present invention is useful for cyclically switching a plurality of radio-frequency input signals to a plurality of loads, e.g. antenna elements. The network includes a multiplicity of two-state switching elements arranged in a succession of levels, there being at least $\log_2 N$ levels with at least N/2 switching elements in each level where N is the number of signals to be switched. Each switching element has a pair of imputs and a pair of outputs and is operative in a first state to connect each input to a respective output and, in the second state, to connect each input to the opposite output. The radio-frequency input signals to be switched are applied to respective ones of the inputs in the first level of switching elements and the inputs in each of the other levels in the succession are connected to the outputs of the preceding level in the succession to permit any one of the radio frequency input signals to be transferred to any one of the outputs of the last level of switching elements, with the other input signals appearing at the other outputs in the last level in an order corresponding to the order in which the input signals are applied to the first level switching elements and with the same time delay or phase relationship between the various radio-frequency signals.

BRIEF DESCRIPTION OF THE DRAWINGS

FIG. 1 is a schematic diagram of a cyclic switching network of this invention;

FIG. 2 is a table representing the conditions of the different switch elements in the network of FIG. 1 for different switching states;

FIG. 3 is a block diagram of a radio-frequency transmitting system employing a switching network of the present invention;

Corresponding reference characters indicate corresponding parts throughout the several views of the drawings.

DESCRIPTION OF THE PREFERRED EMBODIMENT

Figures 4, 5:
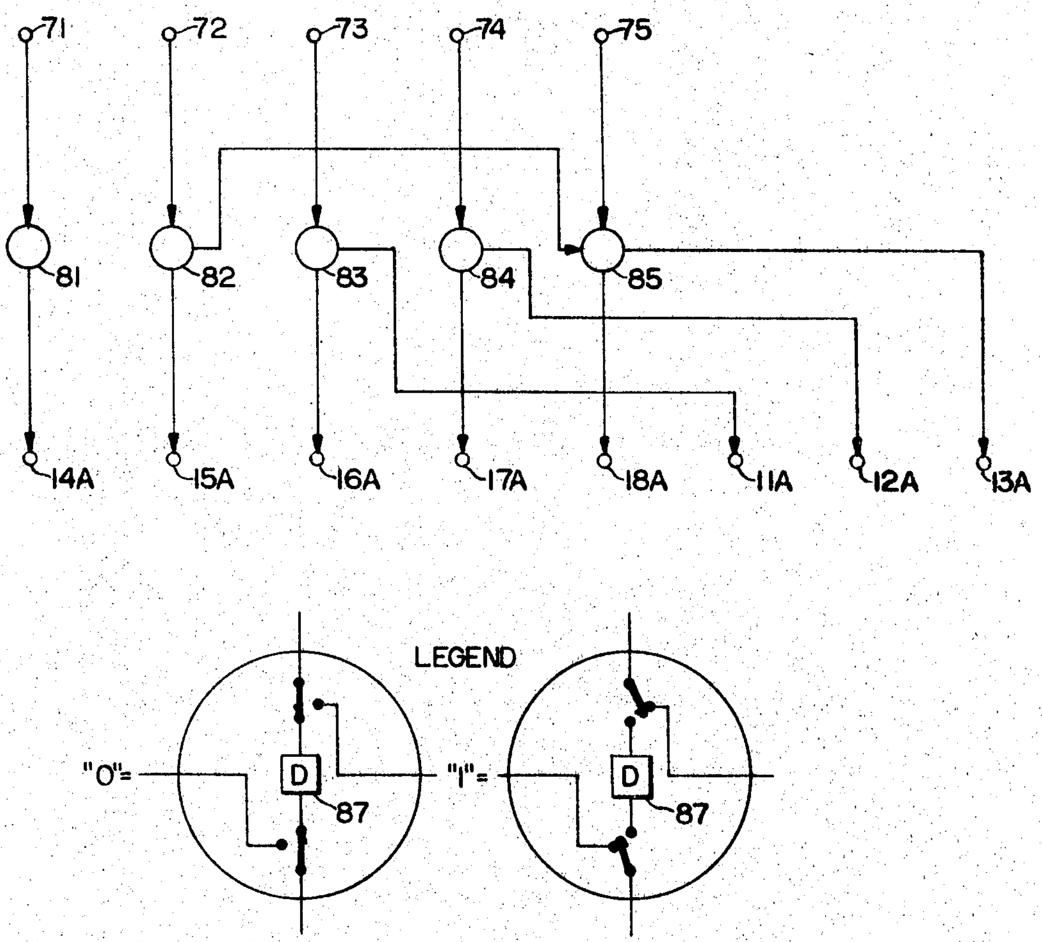
FIG. 4 is a schematic diagram of a switching network for modifying the operation of the switching network of FIG. 1.
FIG. 5 is a table representing the conditions of the switching elements employed in the network of FIG. 4 for different switching states.

Referring now to FIG. 1, the cyclic switching network illustrated there is adapted to connect any one of eight input terminals 11–18 to any one of eight output terminals 21–28. As will be apparent hereinafter, this switching network is actually reciprocal so that the designation of a terminal as being either "input" or "output" is entirely arbitrary and such designations are applied only to facilitate description. Thus, the output terminals can, in fact, be employed as the input terminals and vice versa.

The switching network employs a multiplicity of two-state switching elements which are arranged in a succession of three levels. In the example illustrated, each of the levels includes four switching elements. The first level comprises switching elements 31–34; the second level comprises switching elements 41–44; and the third level comprises switching elements 41–54. The switching elements 31–34, 31–44 and 51–54 are identical and each has a pair of inputs and a pair of outputs.

As noted previously, each switching element is a two-state device. In one of the two-states, designated the "0" state, each input is connected to a respective one of the outputs, as is indicated in the legend accompanying FIG. 1. In the other state, designated the "1" state, each input to the switching element is connected to the opposite output, also as indicated in the legend. As will be understood by those skilled in the art, such a switching element is ideally inherently lossless and reciprocal since each of the inputs is connected to an output in either state. Such switching elements can be constructed using either solid-state switching devices or using electromechanical switches. In the latter case, a magnetically-operated coaxial switch may be used.

The switching elements are interconnected, as illustrated in FIG. 1, in such a manner that a radio-frequency input signal applide to any one of the input terminals 11–18 passes through one switching element in each of the levels and further in such a manner that the path length through each level of switching elements is the same for either state of the respective switching element. The interconnections between the terminals and the successive levels are further such that the amount of lateral or cyclic shift within the group of signal paths which may occur in passing from one level to the next is graduated from each level to the next by a factor of two. In other words, the lateral shift which may be introduced by the switching elements in any one of the levels is related to the shift which can be introduced by the elements in any other level by a power of two. Thus, the two inputs of switching element 32 are connected to two input terminals (12 and 16) which are separated by a count of four within the group of signal paths whereas the inputs to switching element 42 are connected to the outputs of switching elements (31 and 33) which are separated by only two spaces or counts. In corresponding manner, the inputs to switching element 52 are connected to the outputs of switching elements (42 and 43) which are only one space or count apart. The interconnections are also cyclic in nature. Thus, in FIG. 1 the leads which are shown as being broken off on the right hand side of the drawing are in fact connected to the corresponding lead on the left hand side.

It can thus be seen that, as a signal applied to one of the input terminals passes down through the switching network, it can be shifted "laterally" within the cyclic group of signal paths by successively graduated amounts so that any output terminal can be reached. Assuming that the switching elements are appropriately operated, it is also a property of this network that input signals applied to the other remaining input terminals will be transferred to the remaining output terminals following the original ordering. The table of FIG. 2 gives the states or conditions required of the different switching elements to provide different amounts of cyclic shift. For such shift state, the top row of binary digits designates the required conditions of the top level of switching elements (31–34); the second row designates the second level (41–45); and the third row designates the last level (51–54). In the table, shift state 1 is that in which the input terminal 11 is connected to output terminal 21, input 12 is connected to output terminal 22 and so on. State 2 is that in which input terminal 11 is connected to output terminal 22, input terminal 12 is connected to output terminal 23 and so on in cyclic fashion with input terminal 18 being connected to output terminal 21. The successive states progress in similar fashion up to state 0 (alternatively designated state 8) in which input terminal 11 is connected to output terminal 28, input terminal 12 is connected to output terminal 21, input terminal 13 is connected to output terminal 22 and so on. While the states are given in cyclic order, it should be understood that it is not necessary that the switches pass through all intermediate states in going from one shift state to another. Rather, random access to any shift state is available.

Since each of the switching elements is a two-state device, this network is readily adaptable to digital control using conventional binary logic switching circuits. As will be apparent to those skilled in the digital circuit arts, the conditions of the different switching elements follow a logical pattern in progressing from one shift state to the next and such a pattern can be readily produced using conventional digital circuitry. The particular pattern which the states of the switching elements follow will of course depend upon the particular arrangement of the successive levels and the convention employed in designating the states. Since each of the levels is cyclic in nature, each of the levels can be shifted laterally with respect to the other levels without disturbing the inherent characteristics of the network. Further, the levels may be interchanged in vertical order without disturbing the basic properties of the network. It is only necessary that the required gradations in the amounts of shifting available to each signal path be provided so that any one of the input terminals can be connected to an arbitrarily selected one of the output terminals.

FIG. 3 illustrates a directional radio-frequency transmitting system employing a switching network of the present invention for stepping the direction of the transmitted beam. The system employs a circular antenna array 91. R.F. power obtained from a signal source 93 is applied to a conventional beam forming network 95 which is operative to divide the power for application to the various elements of the array 91 and to introduce appropriate time delays or phase shifts so that the far fields of the various elements will reinforce one another in one particular direction, thereby forming a R.F. beam. The direction of the beam can be shifted stepwise by interchanging the connections between the beam forming network 95 and the antenna array 91. A switching network 97 of the type illustrated in FIG. 1 is operated under the control of a digital beam position selector 99 to provide such stepwise shifting, the selector 99 being operative to control the various switching elements in the network 97 in the desired logical pattern, e.g. as illustrated in FIG. 2. The direction of the beams can also be shifted to any discrete beam position without passing through intermediate beam positions.

Since all the paths through the network 97 are of the same length and remain unchanged in the different network states, the relative time delays or phasings of the signals passed by the switching network are not affected. Thus, the far fields of the various antenna elements will combine to form a beam just as if the switching network were not present. Further, the apparatus can be operated over a wide range of frequencies. The switching network, however, allows the beam direction to be shifted. If smaller increments of direction shift than the discrete positions provided by the network are required to provide a continuous directional scan, such vernier direction changes can be provided by means of variable time delay or phase shifting elements within the beam forming network 95. However, since major directional changes are provided by means of the switching network 97 rather than by means of variable time delay or phase shifting within the beam forming network, the number and complexity of the phase shifting circuitry is substantially reduced as compared with prior art systems. Further, the switching networks of the present invention are essentially lossless and are reciprocal and each input signal is applied to a respective load element so that impedance matching is preserved.

Since the switching network 97 is reciprocal, the antenna array 91 can also be used for receiving, assuming that the beam forming network 95 is also reciprocal in operation.

The network illustrated in FIG. 1 can readily be expanded to incorporate additional levels of switching elements. As each additional level of switching elements effectively doubles the maximum lateral shift which can be applied to any one of the signal paths, it can be seen that the number of input terminals and output terminals which can be accommodated is likewise doubled. In general, it may be noted that there must be at least $\log_2 N$ levels with at least N/2 switching elements in each level where N is the number of signals to be switched. The application of these criteria is facilitated when the number of inputs and outputs is equal to a power of two. However, the usefulness of the network is not limited to such situations. Numbers of inputs which are not equal to a power of two can be accommodated by going to a network which has the capability of handling a number of inputs equal to the next higher power of two and by then reordering the application of input signals to the input terminals in an "end around" fashion.

The network illustrated in FIG. 4 provides reordering appropriate to permit the network of FIG. 1 to provide cyclic switching between five input terminals, designated 71–75, and five of the original output terminals. The reordering network includes eight intermediate output terminals 11A–18A which are adapted to be connected to the input terminals 11–18 of the network of FIG. 1 and five two-state switching elements 81–85. As indicated in the legend accompanying FIG. 4, each of the switching elements is operative in a first state, designated the "0" state, to provide a vertical path through the switching element, which vertical path includes a delay line, indicated at 87. In the other state, designated the "1" state, each of the vertical leads is connected directly to a respective laterally extending lead as illustrated. As is apparent hereinafter, the arrangement of the reordering network is such that certain signal paths pass through two of the switching elements 81–85 while other signal paths pass through only one such element. The delay provided by the delay line 87 is selected to be equivalent to the delay introduced by passage through a second switching element so that passing through a single switching element with the delay line present is equivalent to passing through two of the switching elements without the respective delay lines being present Assuming that the intermediate output terminals 11A–18A are connected to the input terminals 11–18 of the network of FIG. 1, signals applied to the input terminals 71–75 can be cyclically switched in relation to the output terminals 24–28 by operating the network of FIG. 1 according to the first through fifth shift states as designated in the table of FIG. 2 and by operating the switching elements in the network of FIG. 4 according to the table of FIG. 5. In effect, the reordering network transfers each of the input signals from a terminal where it will no longer be needed to an input terminal where it will thereafter be needed in the sequence of states. Thus, an input signal will always be present at any input terminal of the network of FIG. 1 when such input terminal is connected to one of the five used output terminals i.e. 24–28. As the delay or path length to which each signal is subjected is the same in any of the five operative states, the phase relationship between the input signals is maintained and thus this reordering network may be used in a beam forming apparatus of the type illustrated in FIG. 3.

As suggested previously, the network of FIG. 1 can be rearranged in various ways without disturbing the inherent characteristics of the network. One such rearrangement is illustrated in FIG. 6 in which similar reference characters have been used with the addition of the suffix A to indicate the relationship between the two networks.

Figures 6, 7:
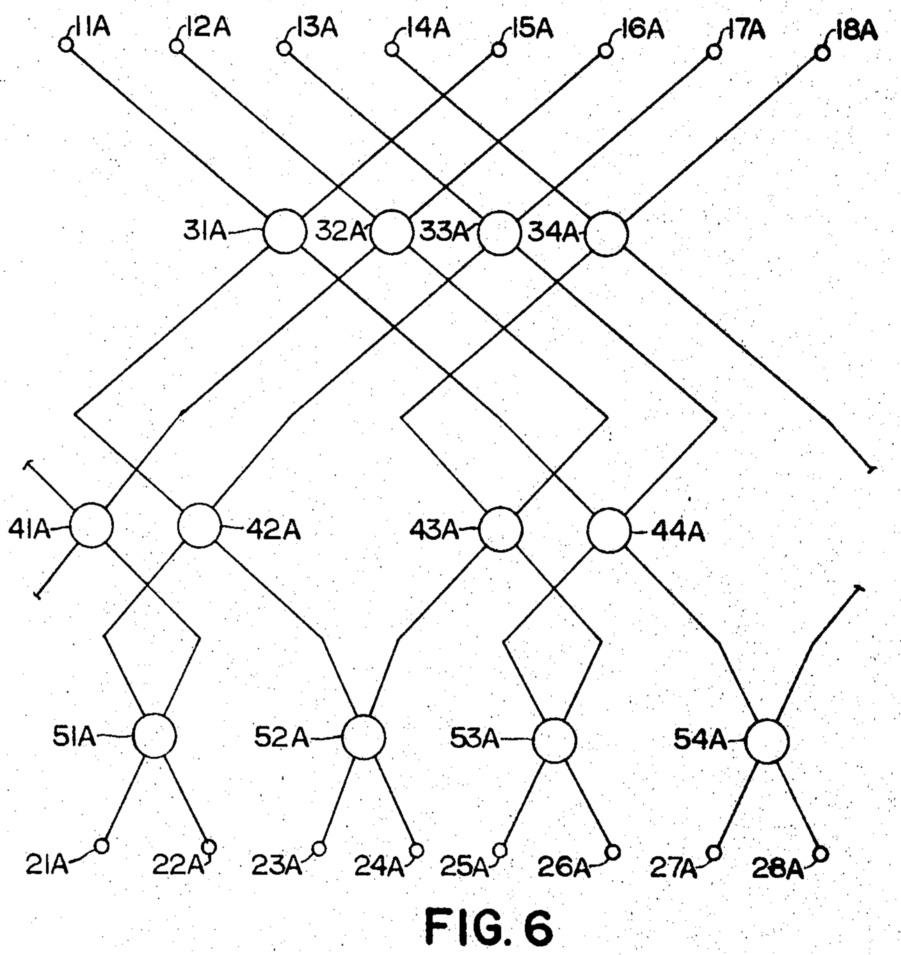
FIG. 6 is a schematic diagram of another embodiment of the cyclic switching network.
FIG. 7 is a table representing the conditions of the different switching elements in the network of FIG. 6 for different switching states.

In the network of FIG. 6, the switching elements have been arranged in groups with the group size in any one level being related to the group size in any other level by a power of two. Thus the single group in the first level contains four switching elements, the two groups in the second level each contain two switching elements, and the elements in the last level are arranged singly.

Each group is itself cyclic in nature and the interconnections between the levels are disposed so that, in one state of each switch, the signals applied thereto are unchanged in position within the corresponding group of signal paths and, in the other state of the switch, the signals are cyclically reversed in position within the group. When the signals are reversed in position within the group, there is then a cyclic shift within the entire group of signal paths. As in the network of FIG. 1, the amount of shift which can be introduced in any one level is related to the shift which can be introduced in any other level by a power of two.

As the rearrangement of interconnections between the levels causes certain of the signal paths to approach certain of the switching elements from the opposite side, as compared with the network of FIG. 1, the states required of these switching elements to produce a given total amount of shift is the binary complement of the states required to produce the same amount of total shift with the network of FIG. 1. Thus, in the table of FIG. 7 which represents the required switching element states for different amounts of total shift, the states required of switching elements 31A, 43A, 44A, 51A and 53A are the complements of the states given in FIG. 2 for the corresponding elements in the network of FIG. 1.

Figure 8:
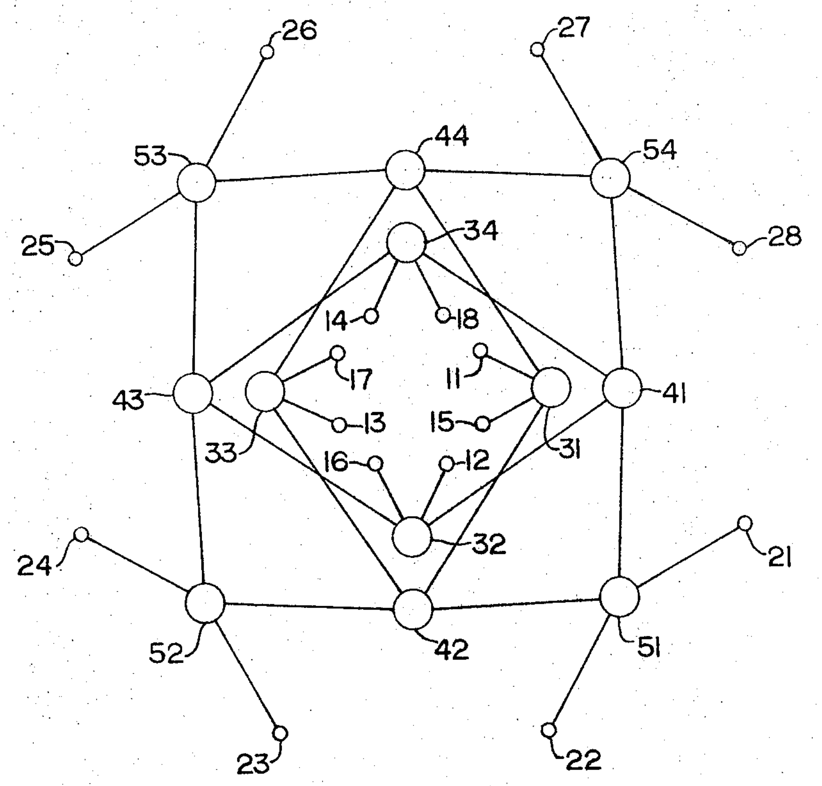
FIG. 8 is a schematic diagram of a circular rearrangement of the network of FIG. 1.

A circular rearrangement of the network of FIG. 1 is illustrated in FIG. 8. This embodiment is of particular interest in that it facilitates the arrangement of the network elements in relation to a circular array of output ports, e.g. the elements of a circular antenna array as discussed with reference to FIG. 3. The pattern of switch states for different amounts of cyclic shift follows that which applies to the FIG. 1 network.

In view of the foregoing, it may be seen that several objects of the present invention are achieved and other advantageous results have been attained.

As various changes could be made in the above described constructions without departing from the scope of the invention, it should be understood that all matter contained in the above description or shown in the accompanying drawings shall be interpreted as illustrative and not in a limiting sense.

What is claimed is:

1. A cyclic switching network for a plurality of radio-frequency input signals, said network comprising:

a multiplicity of two-state switching elements arranged in a succession of levels, there being at least $\log_2 N$ levels with at least N/2 switching elements in each level where N is the number of signals to be switched, each switching element having a pair of inputs and a pair of outputs and being operative in a first state to connect each input to a respective output and, in the second state, to connect each input to the opposite output;

means for applying said radio-frequency input signals to respective ones of the inputs in the first level of switching elements in the succession; and means for connecting the inputs in each of the other levels in the succession to the outputs of the preceding level in the succession to permit any one of the radio frequency input signals applied to the inputs of the first level of switching elements to be transferred to any one of the outputs of the last level of switching elements with the other input signals appearing at the other outputs in the last level in an order corresponding to the order in which the input signals are applied to the first level of switching elements and with the same time delay.

2. A cyclic switching network for a plurality of radio-frequency input signals, said network comprising;

a multiplicity of two-state switching elements arranged in a succession of levels, there being at least $\log_2 N$ levels with at least N/2 switching elements in each level where N is the number of signals to be switched, each switching element having a pair of inputs and a pair of outputs and being operative in a first state to connect each input to a respective output and, in the second state, to connect each input to the opposite output;

means for applying said radio-frequency input signals to respective ones of the inputs in the first level of switching elements in the succession; and means for connecting the inputs in each of the other levels in the succession to the outputs of the preceding level in the succession, each element being connected to selectivey provide a shift in the relative positions, within the respective level, of signals applied thereto, the shift which can be introduced by the switching elements in any one of said levels being related to the shift which can be introduced by the elements in any other level by a power of two, the signal path length through each switching element being the same in either state, whereby any one of the radio-frequency input signals applied to the inputs of the first level of switching elements can be transferred to any one of the outputs of the last level of switching elements with the other input signals appearing at the other outputs in the last level in an order corresponding to the order in which the input signals are applied to the first level of switching elements and with the same time delay.

3. A switching network as set forth in claim 2 wherein N in a power of two.

4. A switching network as set forth in claim 2 wherein N is other than a power of two and wherein said network further comprises switch means for applying selected ones of said radio-frequency input signals to alternate ones of the input in said first level.

5. A switching network as set forth in claim 4 wherein said switch means includes delay means for equalizing delays between different signal paths.

6. A cyclic switching network for a succession of at least eight radio-frequency input signals, said network comprising;

a multiplicity of two-state switching elements arranged in a succession of at least three levels with at least four switching elements in each level, each switching element having a pair of inputs and a pair of outputs and being operative in a first state to connect each input to a respective output and, in the second state, to connect each input to the opposite output;

means for applying a respective pair of said radio-frequency input signals to the inputs of each switching element in said first level, the signals comprising each pair being four apart in said succession of input signals, means for connecting the inputs of each switching element in the second level to outputs of alternate switching elements in the first level; and means for connecting the inputs of each switching element in the third level to outputs of adjacent switching elements in the second level.

7. A cyclic switching network for a plurality of radio-frequency input signals, said network comprising;

a multiplicity of two-state switching elements arranged in a succession of levels, there being at least $\log_2 N$ levels with at least N/2 switching elements in each level where N is the number of signals to be switched, each switching element having a pair of inputs and a pair of outputs and being operative in a first state to connect each input to a respective output and, in the second state, to connect each input to the opposite output;

means for applying said radio-frequency input signals to respective ones of the inputs in the first level of switching elements in the succession; and means for connecting the inputs in each of the other levels in the succession to the outputs of the preceding level in the succession, the switching elements in each level being disposed in groups such that signals applied to the inputs of each switch are unchanged in relative cyclic ponition within the respective group when the switching element is in its first state and are cyclically reversed in relative position within the respective group when the switching element is in its second state, the signal path lengths through the switching element being the same in both states, the group size in any one of said levels being related to the group size in any other level by a power of two, whereby any one of the radio frequency input signals applied to the inputs of the first level of switching elements can be transferred to any one of the outputs of the last level of switching elements with the other input signals appearing at the other outputs in the last level in an order corresponding to the order in which the input signals are applied to the first level of switching elements and with the same time delay.

References Cited

UNITED STATES PATENTS 3,032,723 5/1962 Ring -------------- 333—7 X
3,260,967 7/1966 McClaflin et al. -------- 333—7

OTHER REFERENCES

IBM Tech. Discl. Bulletin, vol. 11, No. 3, August 1968, p. 228.

PAUL L. GEMSLER, Primary Examiner

U.S. Cl. X.R.

307—241